United States Patent [19]

Henninger et al.

[11] 3,978,348

[45] Aug. 31, 1976

[54] ELECTRICAL SIGNAL NOISE SUPPRESSING APPARATUS

[75] Inventors: Heinz W. Henninger, Uhlingen-Muhlhofen; Hans W. Kiefer, NuBdorf; Lothar H. Riethmuller, Uhldingen; Ernst Gunther Robert Spreitzhofer, NuBdorf, all of Germany

[73] Assignee: Bodenseewerk Perkin-Elmer & Co. GmbH, Uberlingen, Germany

[22] Filed: Oct. 29, 1974

[21] Appl. No.: 518,777

[30] Foreign Application Priority Data
Oct. 26, 1973    Germany............................ 2353664

[52] U.S. Cl. ............................... 307/229; 235/183; 328/127; 340/347 NT
[51] Int. Cl.² ....................... G06G 7/12; G06G 7/18
[58] Field of Search ................... 307/229; 328/127; 340/347 CC, 347 NT; 235/183

[56] References Cited
UNITED STATES PATENTS

| | | | |
|---|---|---|---|
| 3,541,320 | 11/1970 | Beall | 328/127 |
| 3,577,140 | 5/1971 | Aasnaes | 340/347 NT |
| 3,617,885 | 11/1971 | Wheable | 340/347 NT |
| 3,623,073 | 11/1971 | Wheable | 340/347 NT |
| 3,649,826 | 3/1972 | Larsson et al. | 340/347 NT |
| 3,716,849 | 2/1973 | Metcalf | 235/183 |
| 3,729,733 | 4/1973 | Dorey | 340/347 NT |
| 3,765,012 | 10/1973 | Grutzediek et al. | 340/347 NT |
| 3,826,983 | 7/1974 | Garratt et al. | 340/347 NT |
| 3,842,416 | 10/1974 | Eto | 340/347 NT |
| 3,849,775 | 11/1974 | Buchanan et al. | 340/347 NT |

*Primary Examiner*—Stanley D. Miller, Jr.
*Attorney, Agent, or Firm*—S. A. Giarratana; F. L. Masselle; J. M. O'Meara

[57] ABSTRACT

A integrator circuit is calibrated prior to measuring input signals therewith, by applying a reference voltage thereto with the output thereof applied to a comparator which has an output threshold set by a limit value signal proportional to the reference voltage. Clock pulses are accumulated by a counter until the comparator output threshold is reached and then a synchronizing means is actuated to simultaneously disconnect the reference voltage from the integrator and stop the counter, to reset the integrator, and to simultaneously connect the input signal to the integrator and the clock pulses to count down the accumulated count in the counter which thereby initiates the measuring mode. When the counter reaches zero, an output signal is produced which disconnects the input signal from the integrator to thereby stop the measuring mode. A frequency divider may be included to adjust the down counting frequency so that the integrating period of the measuring mode can be adjusted in proportion to the constant of integration that existed during the calibration mode.

8 Claims, 2 Drawing Figures

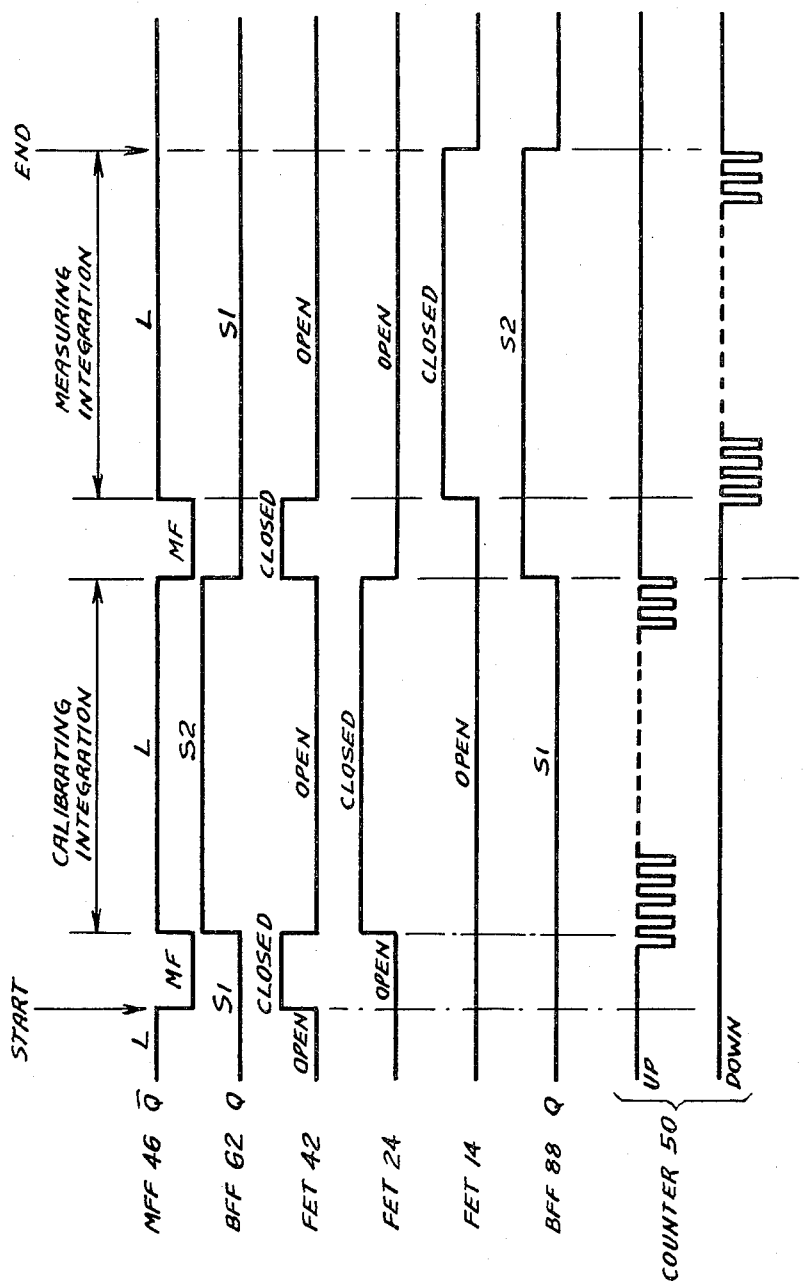

ELECTRICAL SIGNAL NOISE SUPPRESSING APPARATUS

BACKGROUND OF THE INVENTION

This invention is a processing circuit for integrating electrical input signals over an adjustable period of time for the purpose of noise suppression.

For noise suppression in very noisy signals it is a known practice to integrate the signal for a predetermined time period so as to suppress the noise by averaging it out over the integration period; assuming the signal amplitude remains substantially constant during the integration period, the integral is then directly proportional to the signal amplitude.

Noise suppression by integrating for a predetermined period is particularly useful in atomic absorption spectrometers that determine the concentration of a specific element in a sample mixture by spraying the sample into a flame which atomizes it. A light beam containing the spectral lines of the element of interest is directed through the flame. Light radiation in the spectrum of the element is absorbed thereby with the amount of absorption, which is detected by a photodetector and associated signal processing circuitry, being proportional to the concentration of that element in the sample. The signals produced by the photodetector and the signal processing circuitry are very noisy so that some sort of noise suppressing system is necessary in order to measure the absorption with a reasonable degree of accuracy.

Known integrators for noise suppression, such as Miller integrators, customarily consist of an operational amplifier with an ohmic resistor in the input circuit and a negative feedback through a capacitor. However, integrator circuits of this type are prone to variation of their integration constants, due particularly to variations in the capacitance of the negative feedback capacitor and these variations degrade the accuracy of measurement in the prior art where the integration is carried out over a fixed period.

SUMMARY OF THE INVENTION

An object of the present invention is to provide an integrating signal-processing circuit in which the integrator is calibrated prior to measurement in a manner such that the effect of any variations in the constant of integration is automatically compensated for during the measuring integration period.

Another object is to provide means for adjusting the length of the measuring integration period.

These and other objects are satisfied by the circuit of the present invention in which an integrator circuit is first operated in a calibrating mode to integrate a reference voltage signal. A comparator is tapped into the integrator output and compares this output with a limit value signal that is proportional to the reference voltage. While the reference voltage is being integrated, a counter counts up clock pulses until the integral of the reference signal, which increases linearly, at the slope determined by the constant of integration, surpasses the limit value signal and causes the comparator output to change polarity. This comparator output is connected to actuate a synchronizing means, which consists of an array of flip-flops, gating elements and switch elements. When actuated by the aforementioned change in polarity of the comparator output the synchronizing means operates to simultaneously disconnect the reference voltage from the integrator input and stop the counter, to reset the integrator, and to simultaneously connect the input signal to the integrator and the clock pulses to the count down input of the counter which thereby initiates the measuring period. The integration length of the measuring mode is defined by the time it takes for the counter to count down the number of pulses previously accumulated therein during the calibrated mode and the counter then produces a zero count output signal that causes the synchronizing means to disconnect the input signal from the integrator and thereby stops the measuring mode.

The length of the measuring mode is made adjustable proportionally to the constant of integration during the calibration mode by including a frequency divider through which the clock pulses are directed to the count down input of the counter.

In this circuit the integration constant of the integrator during the calibration mode is proportional to the length of the integration period during the measuring mode. Therefore, variations in the integration constant during the measuring mode, due for example to a change in the capacitance of the capacitor incorporated therein, are automatically compensated for precise a change in the integration time of the measuring mode. Moreover, it is not necessary that the reference voltage or the frequency of the clock pulses be of any prcise magnitude, it is only necessary that their magnitudes do not change between the calibrating mode and the measuring mode.

DESCRIPTION OF THE DRAWINGS

The invention is described in detail below in connection with a preferred embodiment illustrated in the accompanying drawings in which:

FIG. 2 is a graphic representation of the states of the elements of the switch control system and the clock pulses which are counted by the counter in the circuit of FIG. 1.

DETAILED DESCRIPTION

Figure 1:
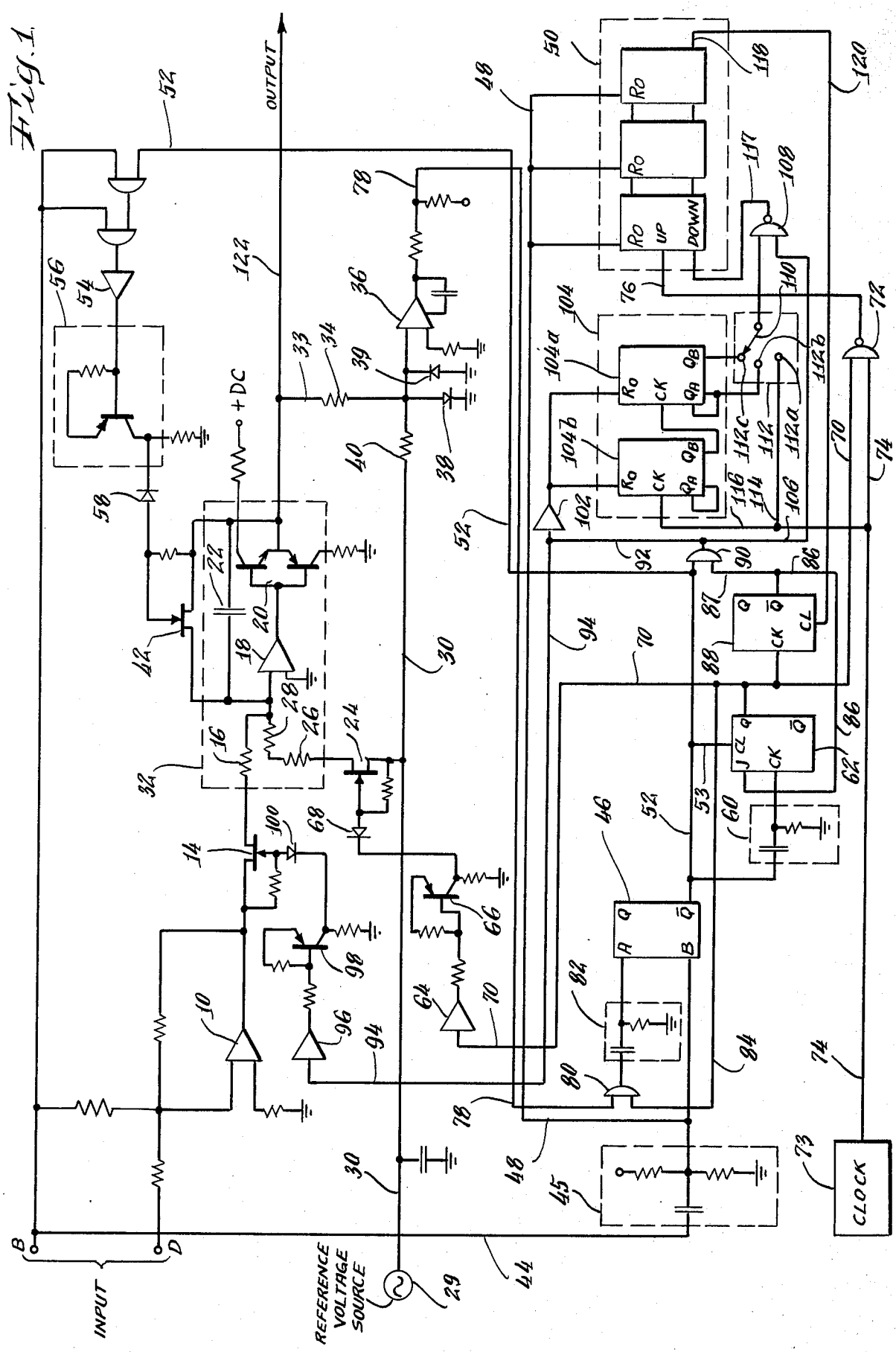
FIG. 1 is schematic circuit diagram of a processing circuit of this invention.

Referring to the drawings, a preferred embodiment of the signal processing circuit of this invention as shown consists generally of an integrator circuit 32 for integrating input signals B and D, which are of opposite polarities, a comparator 36 which is an operational amplifier connected as a comparator, a DC source 29 of reference voltage, a clock 73 for supplying clock pulses of fixed frequency, a counter 50 for counting the clock pulses up and then down, and a synchronizing means consisting of a monostable flip-flop circuit element 46 (MFF 46), two bistable flip-flop circuit elements 62 and 88 (BFF 62 and BFF 88), field effect transistors 14, 24 and 42 (FET 14, FET 24 and FET 42) and various gate elements connected as subsequently described for operating the processing circuit of this invention successively in a calibrating mode for calibrating the integrator 32 and then in a measuring mode for measuring the input signals.

In the embodiment shown, the input signals to be integrated are two signals B and D of opposite polarity which are summed by a summing amplifier 10 and that sum is passed by an electronic switch formed of FET 14, through an input resistor 16 to the inverting input of an operational amplifier 18. The output of operational amplifier 18 is fed through a successive amplifier stage 20 to the integrator output line 122 and a negative feedback loop containing a capacitor 22 is connected across the amplifiers 18 and 20, from the output side of amplifier stage 20 to the inverting input of amplifier 18. A DC reference voltage, of +10 volts for example, from the reference voltage source 29 and line 30 is also connectable to the inverting input of operational amplifier 18 through an electronic switch formed of FET 24 and through resistors 26 and 28. The integrator 32, as indicated, is formed by the foregoing arrangement of operational amplifier 18, amplifier stage 20, capacitor 22 and the input resistors 16, 26 and 28.

The output of the integrator 32 is connected to the inverting input of an operational amplifier, which constitutes the comparator 36, through a resistor 34 in a line 33 that is tapped into integrator output line 122 and connected to the comparator input. As shown the input of the comparator is suitably protected by a pair of diodes 38, 39 connected respectively in opposite directions to ground.

A limit value signal voltage is also connected to the comparator 36 input from the reference voltage source 29 via reference voltage line 30 and through a resistor 40, so that the limit value signal is proportional to the reference voltage being supplied to the integrator 32 through the FET 24.

The output of the comparator 36 is one polarity or the other depending on whether the sum of the voltages applied to its input (respectively through resistors 34 and 40) is positive or negative, and a change in the polarity of the comparator is applied to actuate the synchronizing means, subsequently described in detail, which automatically controls the switching from the calibrating mode in which the reference voltage is integrated, to the measuring mode in which the input signals (sum of inputs B and D) are integrated.

The output of the comparator 36 is connected to the synchronizing means over a line 78 to one input of an AND gate 80, the output of which is connected through a differentiating circuit 82 to the A input of the monostable flip-flop 46 (MFF 46). Power for operating the calibration mode is drawn from input signal B through a line 44 and is connected through a differentiating circuit 45 to MFF 46 input B.

A line 48 tapped into the input B of MFF 46, between the differentiating circuit 45 and the input terminal B, is connected to reset terminals of the counter 50 which is thereby reset at the start of a calibrating mode operation.

The steady state output MFF 46 from its inverting output $\overline{Q}$ is low, as indicated in FIG. 2, and a short pulse, designated MF, of 20 milliseconds duration for example, emits therefrom when the MFF 46 is actuated at the start of operation by a signal through line 44. This MF pulse is connected by a line 52 respectively to: the clock input CK of bistable flip-flop 62 (BFF) 62 through a differentiating circuit 60, to the reset input CL of BFF 62 through a tap line 53, and to the FET 42 which is connected across the capacitor 22 reset the integrator 32 to zero prior to the calibrating and the measuring modes. As shown the line 52 is connected to FET 42 through a pair of AND gates which are each enabled by input signal B, an inverter 54, an amplifier circuit 56 and a diode 58.

At the start of the calibration mode, BFF 62 is in its state S1 (FIG. 2) having been reset to this state at the end of the previous calibrating mode as subsequently described, and the back slope portion of the short MF pulse from MFF 46 is applied through differentiating circuit 60 to the CK input of BFF 62 and changes BFF 62 to its S2 state.

The high Q output of BFF 62 is connected to an output line 70 and to the CK input of the BFF 88. The output line 70 connects BFF 62 to the FET 24, through an inverter 64, an amplifier stage 66 and a diode 68 for actuating the FET 24 to connect reference voltage from line 30 through to the integrator 32. The output line 70 also connects the BFF 62 output Q to one input of a NAND gate 72. The other input of NAND gate 72 is connected through a line 74 to a clock means 73 for generating pulses at a fixed frequency so that clock pulses are applied through a line 76 to the up input of the three element counter 50 simultaneously with the reference voltage being applied to the integrator 32.

The output from the $\overline{Q}$ output of the BFF 88 is connected by a feedback line 86 to the $\overline{J}$ preparation input of BFF 62 for preventing resetting of BFF 62 to its state S2 by the back slope of the short MF pulse which issues from MFF 46 at the end of each calibration mode. The BFF 88 output Q is also connected by a line 87 to one input of an AND gate 90; the other input of gate 90 is connected into line 52 from the $\overline{Q}$ output of the MFF 46. Outputs from MFF 46 and BFF 88 thus cooperate to pass a signal into a line 92 which connects into a line 94 which is connected to actuate FET 14 through an inverter 96, an amplifier stage 98 and a diode 100. The line 92 from gate 90 is also connected through an inverter 102 to the reset inputs $R_o$ of a two decade stage auxiliary counter 104 (which is utilized as a frequency divider as subsequently described) and, through branch line 106, to one input of a NAND gate 108. The other input of NAND gate 108 is connected to the switching arm 110 of a selector switch 112 of the frequency dividing arrangement described below. The output of the gate 108 is connected through a line 117 to the count down input terminal of the counter 50 for applying thereto clock pulses from clock 73 when appropriate signals, through gates 108 and 90, are received from MFF 46 via line 52 and from BFF 88 via line 87.

The frequency divider, already mentioned, consists of the auxiliary counter 104 and selector switch 112 and is utilized for selectively dividing the frequency of the pulses from clock 73 as means for adjusting the time duration of the measuring mode integration in proportion to the constant of integration that was previously derived as the up count of the counter 50 during the calibration mode.

Clock pulses through line 74 are applied to the CK input of the first decade 104b of counter 104 through a line 116. A branch line 114 is connected between the line 116 and the contact 112a of switch 112. As shown, when the switch arm 110 of switch 112 is on contact 112a clock pulses from line 74 are passed directly through the switch 112 to one input of NAND gate 108. In the other two alternative positions of the switch arm 110, on contact 112b and contact 112c respectively, clock pulses tapped from line 74 pass through the auxiliary counter 104; contact 112b connects the switch to output $Q_A$ of counter decade 104a while contact 112c connects the switch with output $Q_B$ thereof.

When the counter 50 has counted down of the output previously counted up, it directs a zero count output 118 through line 120 to the CL input of BFF 88 which resets BFF 88 to its initial state S1 thereby changes the signals over lines 92 and 94 to open FET 14 which interrupts the measuring mode integration.

OPERATION

At the start of any calibration measurement cycle, as illustrated in FIG. 2, MFF 46 is in its steady state L, BFF 62 is in its state S1, FETs 42, 24 and 14 are open, and BFF 88 is in its state S1.

Operation is initiated by the input signal B passing through line 44 to the input B of MFF 46 which changes momentarily to its non-steady state and issues a short pulse MF through output line 52. This MF pulse actuates FET 42 to reset the integrator 32 simultaneously with the input signal B passing through line 44 and line 48 reset the counter 50. At the end of this MF pulse its back slope portion passes to the CK input of BFF 62 which changes to its S2 state.

In its S2 state, BFF 62 issues a signal from its Q output through line 70 to close, ie. render conductive, the FET 24 which thereby passes reference voltage from source 29 through line 30 to the integrator 32 to initiate the calibration mode integrating. At this time the reference voltage line 30 is also applied through resistor 40 as the limit value signal to the comparator 36, which also receives the integrator output through tap line 33 into the integrator output line 122.

The output from BFF 62 is also carried over the lower branch of line 70 to enable the gate 72 so that clock pulses from line 74 cause output from gate 72 and to pass through line 76 to the up input of the counter 50.

The output of the integrator 32 supplies linearly increasing signals to the comparator 36 and when the integrator signals equal and pass the value of the limit value signal, the polarity of the comparator output changes and this output passes through line 78 to AND gate 80 which is then enabled by Q output of BFF 62, over lines 70 and 84. Output from gate 80 then actuates input A of MFF 46, which changes to change momentarily to its non-steady state with the resulting MF pulse output thereof terminating the calibration period by resetting BFF 62 to open FET 24 and to disable gate 72.

This MF pulse also actuates FET 42 again to reset the integrator 32 and resets the resetting of BFF 62 to its state S1 causes input CK of BFF 88 to receive Q output from BFF 62, and changes the state of BFF 88 from S1 to S2. In state S2 BFF 88 issues signals over feedback line 86 to the J input of BFF 62 which is not thereafter set to its state S2 at the end of this MF pulse by the back slope portion thereof. With the BFF 62 in its state S1 the FET 24 remains opened to disconnect the reference voltage from the integrator input and the NAND gate 72 remains disabled to stop clock pulses at the up input of counter 50.

With BFF 88 in its state S2 its output, over line 87, opens gate 90 which is then enabled by the output from MFF 46, over line 52. Gate 90 then passes a signal through lines 92 and 94 to reset the auxiliary counter 104 through inverter 102 and to actuate FET 14 which connects the sum of the input signals B and D, from summing amplifier 10, to the integrator 32. This signal is also applied through line 106 to act in cooperation with the pulses derived from the auxiliary counter 104 by switch 112 so that those pulses are applied to the down input of counter 50.

The integration of the measuring mode then proceeds until the counter 50 produces the zero count output 118 over line 120 to reset BFF 88 which changes to its S1 state. This closes gate 90 and opens FET 14 to interrupt the measuring mode.

What is claimed is:

1. Electrical signal noise suppressing apparatus, comprising:
    a comparator for producing an output of different polarity when each of two signal inputs thereto is of greater magnitude;
    an integrator for producing an output at some rate proportional with an input thereto, said output from said integrator being one input signal to said comparator;
    means for resetting said integrator;
    first switch means for connecting the noise bearing signal to said integrator input;
    a source for supplying a reference voltage;
    means for deriving a voltage threshold from said reference voltage, said voltage threshold being the other input to said comparator;
    second switch means for connecting said reference voltage to said integrator input;
    clock means for generating pulses at a fixed frequency;
    a counter for accumulating pulses in two directions and for producing a zero count output, said counter having an up count input and a down count input; and
    control means for synchronizing said resetting means with said first and second switch means and for individually gating said clock pulses to said up count and down count inputs, said resetting means being initially actuated by the noise bearing signal with a calibration mode starting immediately thereafter by said second switch means becoming conductive and by said clock pulses being admitted to said up count input until said comparator output changes polarity to again actuate said resetting means, with a measuring mode starting immediately thereafter by said first switch means becoming conductive and by said clock pulses being admitted to said down count input until said zero count output is produced.

2. The apparatus of claim 1 wherein said down count input is connected through means for dividing the frequency of said clock pulses.

3. The apparatus of claim 2 wherein the divisor of said frequency dividing means is variable.

4. The apparatus of claim 1 wherein said voltage threshold means includes a resistor through which said reference voltage connects to said comparator input.

5. The apparatus of claim 1 wherein said control means includes a monostable flip-flop having a first input, a second input and an output; first and second bistable flip-flops each having a reset input, a clock input and an output; first and second gates through which said clock pulses are admitted to said up count and down count inputs respectively; said monostable flip-flop having the noise bearing signal connected to said first input thereof and said output therefrom connected to actuate said resetting means and both of said reset and clock inputs to said first bistable flip-flop; said output from said first bistable flip-flop being connected to actuate said second switch means, said first gate and said clock input to said second bistable flip-flop; said output from said second bistable flip-flop being connected to actuate said first switch means and said second gate; and said comparator output being connected to said second input of said monostable flip-flop, with said zero count output being connected to said reset input of said second bistable flip-flop.

6. The apparatus of claim 5 wherein said down count input is connected through means for dividing the frequency of said clock pulses.

7. The apparatus of claim 6 wherein the divisor of said frequency dividing means is variable.

8. The apparatus of claim 7 wherein said voltage threshold means includes a resistor through which said reference voltage connects to said comparator input.

* * * * *

UNITED STATES PATENT AND TRADEMARK OFFICE
CERTIFICATE OF CORRECTION

PATENT NO. : 3,978,348

DATED : August 31, 1976

INVENTOR(S) : Heinz W. Henninger, et al

It is certified that error appears in the above-identified patent and that said Letters Patent are hereby corrected as shown below:

Column 2, line 5, --integrating-- should be inserted after "measuring".
Column 2, line 6, "integration" should be deleted.

Column 2, lines 24 and 25 "precise" should be --by--.

Column 2, line 28, "prcise" should be --precise--.

Column 3, line 42, "Power for operating" should be --A signal for starting--.

Column 3, line 60, --to-- should be inserted before "reset".

Column 4, line 23, "Q" should --$\overline{Q}$--.

Column 4, line 68, --and-- should be inserted before "thereby".

Column 5, line 5, -- / -- should be inserted between "calibration" and

UNITED STATES PATENT AND TRADEMARK OFFICE
CERTIFICATE OF CORRECTION

PATENT NO. : 3,978,348

DATED : August 31, 1976

INVENTOR(S) : Heinz W. Henninger, et al

It is certified that error appears in the above-identified patent and that said Letters Patent are hereby corrected as shown below:

"measurement".

Column 5, line 15, --to-- should be inserted before "reset".

Column 5, line 30, "and" should be deleted.

Column 5, line 39, "to change" should be deleted.

Column 5, line 45, "resets" should be deleted.

Signed and Sealed this

Thirtieth Day of November 1976

[SEAL]

Attest:

RUTH C. MASON
Attesting Officer

C. MARSHALL DANN
Commissioner of Patents and Trademarks